United States Patent [19]
Yanagihara

[11] Patent Number: 5,648,855
[45] Date of Patent: Jul. 15, 1997

[54] METHOD AND APPARATUS FOR VARYING-SPEED REPRODUCTION OF DIGITAL VIDEO SIGNALS

[75] Inventor: Naofumi Yanagihara, Tokyo, Japan

[73] Assignee: Sony Corporation, Tokyo, Japan

[21] Appl. No.: 520,839

[22] Filed: Aug. 29, 1995

[30]     Foreign Application Priority Data

Sep. 6, 1994 [JP]  Japan .................................. 6-212755

[51] Int. Cl.$^6$ .............................. H04N 5/76; G11B 15/18; G11B 15/46
[52] U.S. Cl. .................... 386/80; 360/72.2; 360/73.08; 386/81
[58] Field of Search ..................... 358/335, 312; 360/10.1, 10.3, 69, 70, 71, 73.05, 73.08, 73.09, 73.12, 73.13, 72.2, 72.3, 10.2, 73.04, 73.11, 32, 78.04; H04N 5/76; G11B 15/18, 15/46

[56]         References Cited

U.S. PATENT DOCUMENTS

| | | | |
|---|---|---|---|
| 4,679,098 | 7/1987 | Williams et al. | 360/10.1 |
| 5,008,763 | 4/1991 | Horino | 360/70 |
| 5,025,330 | 6/1991 | Nishimiya | 360/78.04 |
| 5,151,830 | 9/1992 | Goto et al. | 360/32 |
| 5,392,174 | 2/1995 | Suzuki | 360/78.04 |
| 5,434,723 | 7/1995 | Aoki | 360/70 |

Primary Examiner—Thai Q. Tran
Assistant Examiner—Luanne P. Din
Attorney, Agent, or Firm—William S. Frommer; Alvin Sinderbrand

[57]         ABSTRACT

A varying speed reproducing method of digital video signals is disclosed. With this method, digital video signals are reproduced in a phase locked state from a magnetic tape by applying a phase servo to a tape running system using the difference between the number of a pre-set one of sync blocks reproduced by each tracing by a rotary magnetic head and the number of a target sync block as a phase error. Thus the pre-set sync block may be positively reproduced by each tracing by the rotary magentic head during varying speed reproduction of the magentic tape having the digital video signals recorded on the inclined tracks thereof. A reproducing apparatus is also disclosed. With the reproducing apparatus, digital video signals may be reproduced from the magnetic tape in a phase locked state by feeding back the phase error signal from the phase error signal generating means to the phase loop of the tape running system designed for running the magnetic tape during varying speed reproduction. This enables the pre-set sync block to be positively reproduced by each tracing by the rotary magnetic head during varying speed reproduction of the magnetic tape having the digital video signals recorded on the inclined tracks thereof.

5 Claims, 10 Drawing Sheets

METHOD AND APPARATUS FOR VARYING-SPEED REPRODUCTION OF DIGITAL VIDEO SIGNALS

CROSS-REFERENCES TO RELATED PATENTS

As applications pertinent to the present application, JP Patent Applications Nos. 05-056576 (filing date, Feb. 22, 1993), 05-195533 (filing date, Jul. 13, 1993), 05-287702 (filing date, Oct. 22, 1993, 06-142042 (filing date, Jun. 23, 1994), 06-200878 (filing date, Aug. 25, 1994) and 06-206961 (filing data, Aug. 31, 1994) have been proposed by the present Assignee. U.S. applications corresponding to these six application are now pending. Each of the above applications is owned by the present Assignee and is hereby incorporated by reference.

BACKGROUND OF THE INVENTION

This invention relates to a method and apparatus for digital video signals in which data produced on encoding video signals by the MPEG system may be directly recorded and a reproduced picture of high picture quality may be produced on varying-speed reproduction.

Recently, developments of a digital video tape recorder (digital VTR) in which video signals are converted into digital signals and transformed by discrete cosine transform (DCT) so as to be variable length encoded by e.g., Huffman code and recorded on a magnetic tape by an inclined azimuth recording system using a rotary head, are proceeding briskly. Such digital VTR can be set to a mode of recording video signals of the current television system, such as the NTSC system, referred to herein as SD mode, or to a mode of recording high-definition television signals (HDTV signals), referred to herein as HD mode.

With the SD mode, video signals are recorded after compression to digital video signals of approximately 25 Mbps, whereas, with the HD mode, the HDTV signals are recorded after compression to digital video signals of approximately 50 Mbps.

With the conventional digital VTR, it is contemplated to directly record input digital video signals, that is input data, on a magnetic tape, or to reproduce and directly output data recorded on a magnetic tape. That is, by adding the function of directly recording/reproducing digital video signals to the conventional digital VTR, it becomes unnecessary to decode the input digital video signals for reproducing e.g., HDTV signals, and to re-encode the HDTV signals by a pre-set encoding system for recording on the magnetic tape, thereby eliminating hardware waste.

Specifically, if digital video signals produced on encoding video signals by MPEG system, that is a moving picture encoding system standardized by the Working Group (WG) 11 of the Sub-Committee (SC) of Joint Technical Committee (JTC) of the International Electrical Conference (IEC) and International Standardization Organization (ISO), or digital video signals reproduced from an optical disc, are supplied to a digital VTR, it is convenient for the digital VTR to have the function of directly recording/reproducing these digital video signals.

The advanced television (ATV) system, a digital broadcasting employing the MPEG system as the encoding system, is now explained.

In FIG. 1, which is a block diagram showing the construction of a transmission system of the ATV system, 101 is a video encoder and 102 an audio encoder. The video encoder 101 is fed via an input terminal 103 with video signals of the HDTV system, while the audio encoder 102 is fed via an input terminal with an audio signal.

The video encoder 101 encodes the input HDTV signals by the MPEG system by way of data compression. That is, the encoder 101 encodes the HDTV signals using a high efficiency encoding system consisting in the combination of DCT and motion compensated prediction coding by way of data compression. The video encoder 101 outputs data of I-picture obtained on intra-field or intra-frame coding, data of the P-picture obtained on forward predictive coding and data of the B-picture obtained on bi-directional coding, in a pre-set sequence, as shown in FIG. 2. The frame and the field are occasionally referred to herein as picture. The I-picture is produced by independent DCT without exploiting correlation with other pictures. With the P-picture, motion compensated predictive coding is carried out from the temporally previous I-or P-picture and the resulting difference signal, that is the prediction error, is transformed by DCT. With the B-picture, motion compensated predictive coding from the temporally forward or backward I- or P-picture is carried out and the resulting difference signal is transformed by DCT. The period of the I-picture is termed the group-of-pictures (GOP). In the present case, M=3 and N=9.

A transport encoder 106 generates a packet from video data encoded by the video encoder 101, audio data encoded by an audio encoder 104 and subsidiary information from an input terminal 107.

In FIG. 3, showing a packet construction, the length of a transmitted packet is 188 bytes. At the leading end of the packet are a ring header having a fixed length of 4 bytes and an adaptation header of a variable length, followed by transmission data consisting of video data or audio data.

Referring to FIG. 1, the packet generated by the transport encoder 106 is supplied to a channel modulator 108 which then modulates the packet using a carrier of a pre-set frequency. An output of the channel modulator 108 is issued at an output terminal 109.

With the ATV system, HDTV signals can be transmitted at a rate of e.g., 10 Mbps which is lower than the recording rate of approximately 25 Mbps for the SD mode of the digital VTR. Thus the signals transmitted by the ATV system can be directly recorded on the digital VTR. By directly recording the transmitted signals on the digital VTR, there is no necessity of decoding HDTV signals from the transmitted signals and inputting the decoded signals to the digital VTR so that waste in hardware is eliminated. In addition, a longer recording time may be achieved by SD mode recording.

However, if the ATV signals are directly recorded with the SD mode on the digital VTR, varying-speed reproduction cannot be achieved for the following reason.

With the ATV system, compression coding is carried out in accordance with the MPEG system, in which the I-pictures, P-pictures and B-pictures are transmitted, as explained previously. Since the head traverses the tracks on the magnetic tape, it becomes impossible to produce data of continuous pictures. If the data of the continuous pictures cannot be obtained, the data of the P-and B-pictures cannot be decoded. It is only the I-picture that can be decoded. Consequently, the varying-speed reproduction becomes possible only by using data of the I-pictures.

However, if the signals transmitted by the ATV system are directly recorded by the digital VTR, packets including the I-pictures cannot be picked up satisfactorily during varying-speed reproduction. On the other hand, it is not definite in which relative position the data of the I-picture is recorded, so that data of the I-picture corresponding to specified picture portions on varying speed reproduction are dropped and hence the picture of that portion cannot be updated for some time thus deteriorating the picture quality during varying speed reproduction.

The present Assignee proposed a system in which in which at least one of the reproducible areas traced by the head at the maximum varying speed is used as an area for varying speed reproduction, and data of the I-picture is extracted form the input bitstream of the ATV system and repeatedly recorded in each varying speed playback area of a number of tracks of the same azimuth corresponding to the multiple speed of the maximum playback speed and in which the signals of the ATV system are directly recorded in other video areas.

This reproduces the varying-speed playback area during varying speed reproduction and a picture may be formed from data of the I-picture reproduced from this area.

For reproducing a specified area in a digital VTR of the inclined azimuth recording system, designed for recording digital video signals on the magnetic tape by the rotary head, the tape running system needs to be controlled to apply phase lock. Although tracking servo is applied during normal reproduction by utilizing tracking control signals (ATF signals) recorded on each track, tracking control utilizing the ATF signals cannot be done in case of varying speed reproduction since the head traverses the tracks on the magnetic tape.

SUMMARY OF THE INVENTION

It is an object of the present invention to provide a digital VTR of the azimuth recording system in which digital video signals are recorded by a rotary head on the magnetic tape, in which the tape running system is controlled during varying-speed reproduction for applying phase lock for reproducing a specified area.

In one aspect, the present invention provides a method for varying speed reproduction of digital video signals including running a magnetic tape having digital video signals recorded on inclined tracks thereof at a speed different from the normal running speed, detecting the number of a pre-set one of sync blocks reproduced by each tracing by a rotary magnetic head, and reproducing digital video signals from the magnetic tape in a phase-locked state by applying phase servo to a tape running system using the difference between the sync block number and the target sync block number as a phase error.

In another aspect, the present invention provides an apparatus for reproducing digital video signals recorded on an inclined track of a magnetic tape having sync block number detection means for detecting the sync block number of a pre-set one of sync blocks reproduced by each tracing by a rotary magnetic head during varying speed reproduction, phase error signal generating means for outputting the difference between the sync block number detected by the sync block number detection means and the target sync block number as a phase error signal, and feedback means for feeding back the phase error signal obtained by the phase error signal generating means to a phase loop of a tape running system running the magnetic tape.

In still another aspect, the present invention provides an apparatus for reproducing digital video signals recorded on an inclined track of a magnetic tape having tracking error signal generating means for extracting a tracking control signal from a playback output by a rotary magnetic head for generating a tracking error signal, phase error signal generating means for generating a phase error signal based upon the number of a pre-set one of sync blocks reproduced by each tracing by the rotary magnetic head; signal switching means for feeding back the tracking error signal obtained by the tracking error signal generating means during normal reproduction and for feeding back the phase error signal obtained by the phase error signal generating means during varying speed reproduction to a phase loop of a tape running system running a magnetic tape, and reproducing means for reproducing the digital video signals from said magnetic tape under phase locked state by applying a phase servo to the tape running system during varying speed reproduction.

With the method for varying speed reproduction of digital video signals according to the present invention, phase error signal generating means detects the number of the last one of the sync blocks reproduced by each tracing by the rotary magnetic head and outputs the difference between the sync block number and a target sync block number as the phase error signal.

With the varying speed reproduction of digital video signals according to the present invention, digital video signals are reproduced in a phase locked state from a magnetic tape by applying a phase servo to a tape running system using the difference between the number of a pre-set one of sync blocks reproduced by each tracing by a rotary magnetic head and the number of a target sync block as a phase error. Thus the pre-set sync block may be positively reproduced by each tracing by the rotary magnetic head during varying speed reproduction of the magnetic tape having the digital video signals recorded on the inclined tracks thereof.

With the reproducing apparatus according to the present invention, digital video signals may be reproduced from the magnetic tape in a phase locked state by feeding back the phase error signal from the phase error signal generating means to the phase loop of the tape running system designed for running the magnetic tape during varying speed reproduction. This enables the pre-set sync block to be positively reproduced by each tracing by the rotary magnetic head during varying speed reproduction of the magnetic tape having the digital video signals recorded on the inclined tracks thereof.

With the reproducing apparatus for digital video signals according to the present invention, feedback signals to the phase loop of the tape running system is switched by switching means so that, during normal reproduction, a tracking error signal generated by tracking error signal generating means from a playback output by the rotary magnetic head is fed back to the phase loop of the tape running system for applying a tracking servo for positively reproducing the digital signals from the inclined track of the magnetic tape under application of the tracking servo and so that, during varying speed reproduction, the phase signal generated by the phase error signal generating means from the playback output by the rotary magnetic head is fed back to the phase loop of the tape running system for applying a phase servo for reproducing the digital video signals from the magnetic tape under application of the phase lock, thereby positively reproducing the pre-set sync block by one tracing of the rotary magnetic head.

DETAILED DESCRIPTION OF THE PREFERRED EMBODIMENTS

Figure 1:
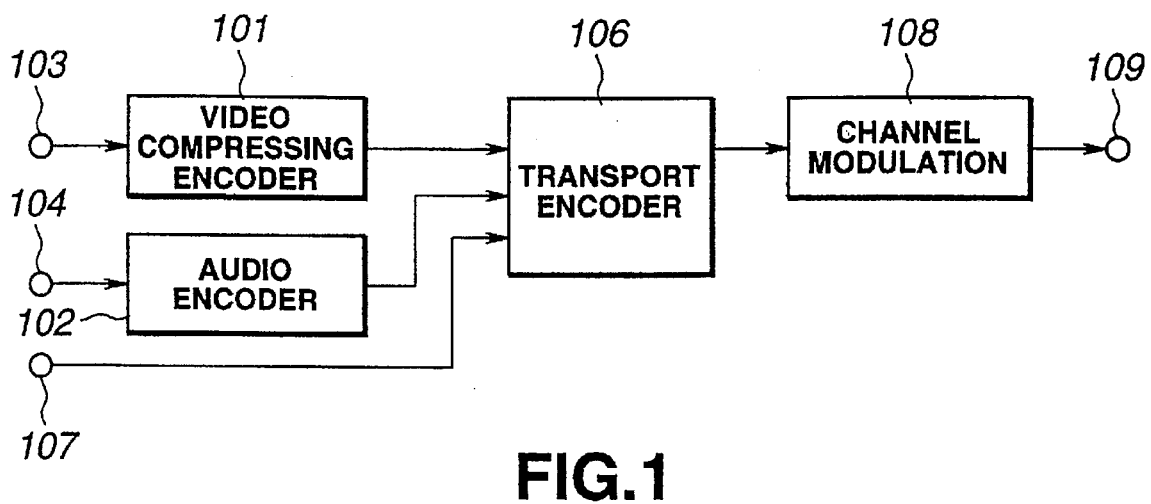
FIG. 1 is a block diagram showing a construction of a transmission system of the ATV system.
Figure 2:
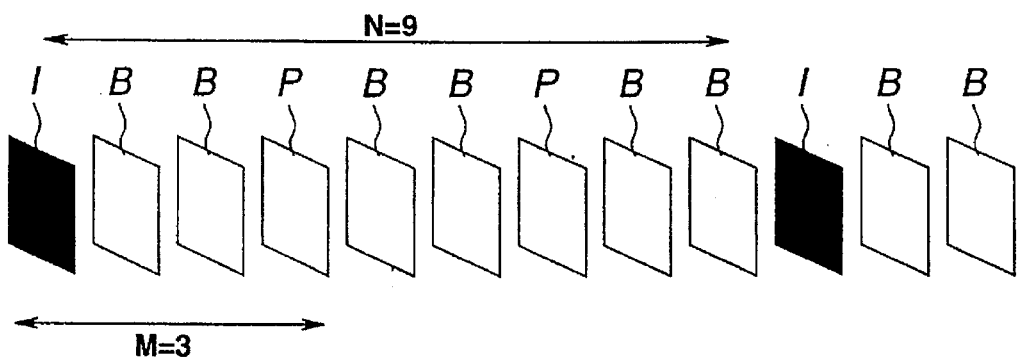
FIG. 2 show the construction of GOP in the MPEG system.

Referring to the drawings, preferred embodiments of a recording apparatus, a recording/reproducing apparatus and a reproducing apparatus for digital video signals according to the present invention will be explained in detail.

Figure 3:
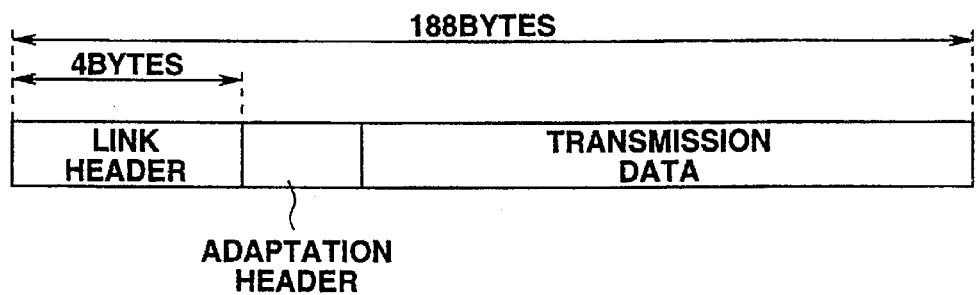
FIG. 3 shows the construction of a packet in the ATV system.
Figure 4:
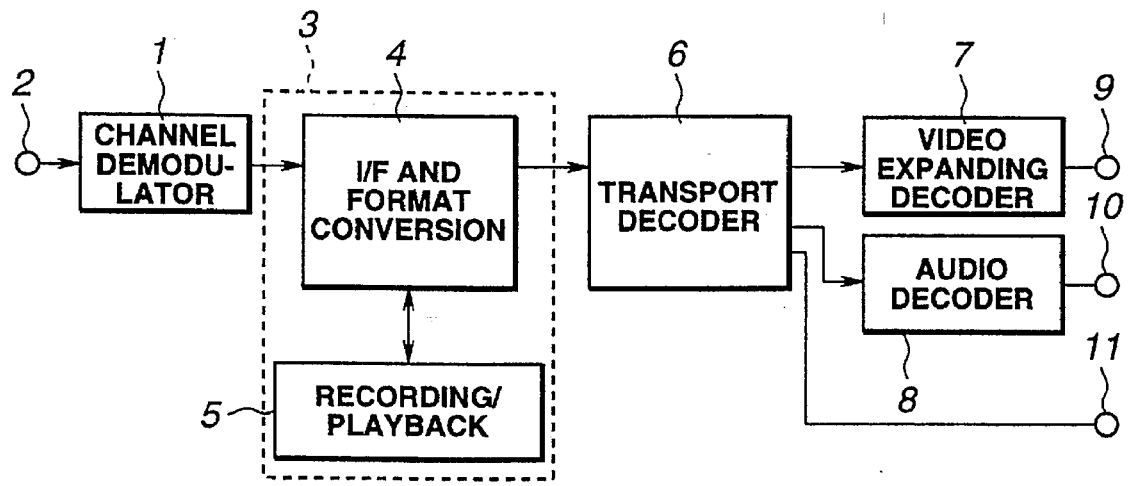
FIG. 4 is a block diagram showing the construction of a video recording/reproducing system according to the present invention.

In FIG. 3, the construction of a video recording/ reproducing system employing a digital VTR according to the present invention is shown in a block diagram. The ATV signals, that is modulated transmission data, enter an input terminal 2 of a channel modulator 1, which demodulates the modulated transmission data for reproducing packeted transmission data.

A digital VTR of the inclined azimuth recording system 3 includes an interface/format converter 4. and a recording/ reproducing unit 5. Packeted data from the channel demodulator 1 is sent via interface/format converter 4 to a transport decoder 6 while being sent to the recording/reproducing unit 5. The data transferred via the interface/format converter 4 to the recording/reproducing unit 5 is recorded by a rotary head in the recording/reproducing unit 5 on a magnetic tape. The interface/format converter 4 formats the data sent to the recording/reproducing unit 5 so that a playback picture ready to see will be produced on varying sped reproduction of the data recorded by the recording/reproducing unit 5, as will be explained subsequently.

The recording/reproducing unit 5 is configured for compressing video signals by DCT and variable length encoding for recording on the magnetic head by the rotary head. The recording/reproducing unit 5 can be set to the SD mode for recording video signals of e.g., NTSC system, or the HD mode for recording HDTV signals. For directly recording ATV signals supplied via the interface/format converter 4, that is transmission data, the recording/reproducing unit 5 is set to the SD mode.

The transport decoder 6 corrects packeted data supplied thereto via the interface/format converter 4 for errors and extracts data and the subsidiary information from the packet.

A video decoder 7 effects decoding of the Huffman code and inverse DCT in accordance with the MPEG system for expanding the data sent thereto for forming base band signals of the HDTV system. The video decoder 7 and an audio decoder 8 are fed with outputs of the transport decoder 6. The video decoder 7 decodes the transmitted data for effecting conversion into analog data and for forming HDTV signals. The audio decoder 8 decodes audio data to produce audio signals which are outputted at an output terminals 10. The subsidiary information outputted at the transport decoder 6 is outputted at an output terminal 11.

Figure 5:
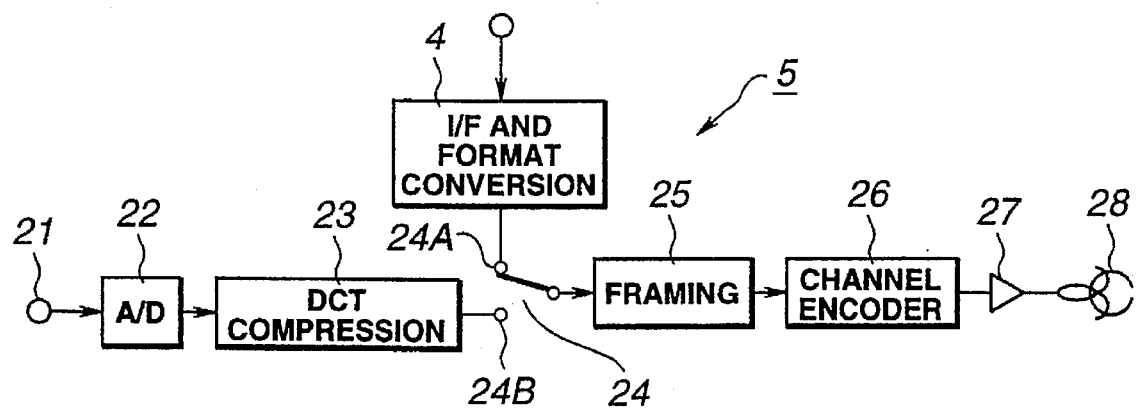
FIG. 5 is a block diagram showing the construction of a recording system of a digital VTR according to the present invention.

Referring to FIG. 5, showing the construction of the recording system of the digital VTR 3 according to the present invention, 21 is an input terminal for HDTV signals for video signals of the current television system, such as NTSC system. For recording video signals from outside, the input terminal 21 is fed with component video signals of the HDTV signals or video signals of the current television system. The component video signals from the input terminal 21, entering the input terminal 21, are fed to an A/D converter 22 so as to be converted into digital signals.

A DCT circuit $\leq$ encodes the input video signals by DCT, quantization and variable length encoding by way of compression. That is, the digitized component video signals from the A/D converter 22 are fed to the DCT circuit 23 so as to be blocked and shuffled by way of DCT. Data resulting from DCT, that is DCT coefficients, is buffered at pre-set buffer units. The total code amount per pre-set buffer unit is estimated and a quantization table which will give the total code amount less than a pre-set value is determined. The DCT coefficients are quantized by this optimum quantization table and variable length encoded so as to be formed into frames.

The switching circuit 24 is switched between recording the transmitted ATV signals and recording video signals supplied at the input terminal 21. The ATV signals are supplied to a terminal 24A of the switching circuit 24 via the interface/format converter 4. An output of the DCT circuit 23 is supplied to a terminal 24B of the switching circuit 24. For recording the transmitted ATV signals, the switching circuit 24 is set to the terminal 24A. For recording the video signals at the input terminal 21, the switching circuit 24 is set to the terminal 24B.

A framing circuit 25 forms the recording data supplied thereto via the switching circuit 24 into frames by any of framing and performs error correction.

An output of the framing circuit 25 is supplied to a channel encoder 26 for modulation. An output of the channel encoder 26 is supplied via a recording amplifier 27 to a rotary head 28. Thus the video signals recorded in compressed state on the magnetic tape or HDTV signals from the input terminal 21 or the ATV signals from the input terminal 2 are recorded by the rotary head 28.

That is, for recording the transmitted ATV signals with the above-described recording system, the switching circuit 24 is set to the terminal 24A. The result is that the ATV signals supplied via the interface/format converter 4 are framed by the framing circuit 25 and modulated by the channel encoder 26 so as to be recorded by the rotary head 28 on the magnetic tape.

For recording the video signals entering the input terminal 21, the switching circuit 24 is set to the terminal 24B. The result is that the video signals supplied at the input terminal 21 are encoded by the DCT circuit 23 and framed by the framing circuit 25 so as to be modulated by the channel encoder 26 and recorded by the rotary head 28 on the magnetic tape.

For recording the ATV signals, the interface/format converter 4 arrays data so that data of the I-picture will be recorded as varying-speed data, referred to herein as trick play data, in a trick play area TP, which is the area reproducible during varying speed reproduction, as will be explained subsequently. During varying speed reproduction, data of the I-picture is read out and decoded.

Figure 6:
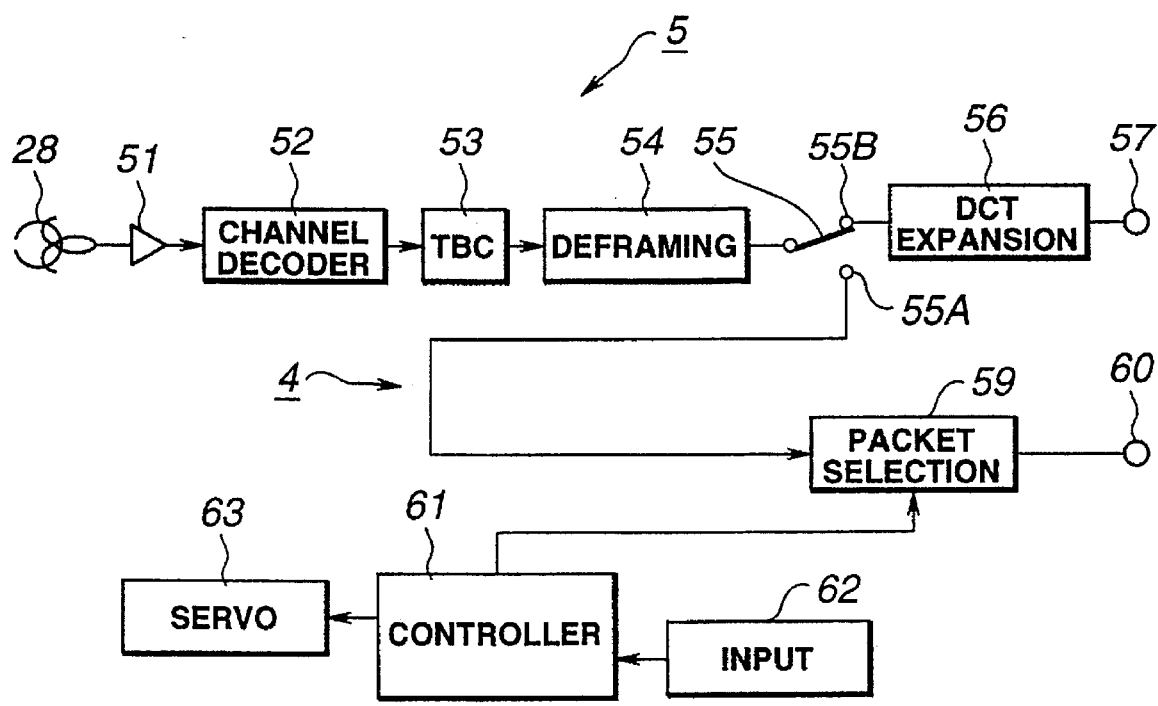
FIG. 6 is a block diagram showing the construction of a reproducing system of the digital VTR.

Referring to FIG. 6, showing the construction of the reproducing system of the digital VTR 3, recording signals on the magnetic tape are reproduced by the rotary head 28 so as to be supplied via a playback amplifier 51 to a channel decoder 52. The channel decoder 52 demodulates the playback signals by a demodulating system associated with the modulating system of the channel encoder 26 of the above-described recording system.

A time base corrector (TBC) 53 removes jitter in the playback signals. That is, the TBC 53 is fed with write clocks derived from the playback signals and readout clocks derived from reference signals, while also being fed with an output of the channel decoder 52. The TBC 53 removes jitter in the playback signals.

The deframing circuit 54 is associated with the framing circuit 25 of the recording system and corrects the playback data from the TBC 53 for errors.

The switching circuit 55 is switched between reproducing the ATV signals and reproducing the component video signals. An output of the deframing circuit 54 is supplied to the switching circuit 55. If the playback signal are ATV signals, the switching circuit 55 is set to the terminal 55A. If the playback signal are component video signals, the switching circuit 55 is set to the terminal 55B.

A DCT circuit 56 is associated with the DCT circuit 23 of the recording system. That is, the DCT circuit 56 decodes and inverse DCTs the variable length codes, as playback data, for expanding the component video signals, recorded in the compressed form, into original baseband signals. That is, an output of the terminal 55B of the switching circuit 55 is fed to the DCT circuit 56 which then restores the playback data into the baseband video signals. These baseband video signals are outputted at an output terminal 57.

An output of the terminal 55A of the switching circuit 55 is supplied to a packet selection circuit 59. During normal reproduction of the ATV signals, the packet selection circuit 59 selects all of packets of playback data supplied via the switching circuit 55. During varying speed reproduction, the packet selection circuit 59 selects and outputs packets of the I-pictures obtained on reproducing the trick play area TP. An output of the packet selection circuit 59 is issued at an output terminal 60.

A controller 61, which manages control of switching between normal reproduction and varying-speed reproduction, is fed with a mode setting signal from an input 62. The controller is responsive to this mode setting signal to control the servo circuit 63 and the packet selection circuit 59. During varying speed reproduction of ATV signals, a tracking error signal detected based upon the ATF signals during normal reproduction is fed back by a servo circuit 63 to a phase loop of a capstan servo for effecting tracking servo. During varying speed reproduction, a phase error signal detected based upon the last sync block number obtained from the playback data for each tracing is fed back to the phase loop of the capstan servo for maintaining the constant relative position between the head tracing and the track at all times so that the phase is locked so as to cause the head to trace the trick play area TP in the track. That is, the trick play areas TP are reproduced during varying speed reproduction for reproducing data of the I-pictures recorded in the trick play areas TP.

Figure 7:
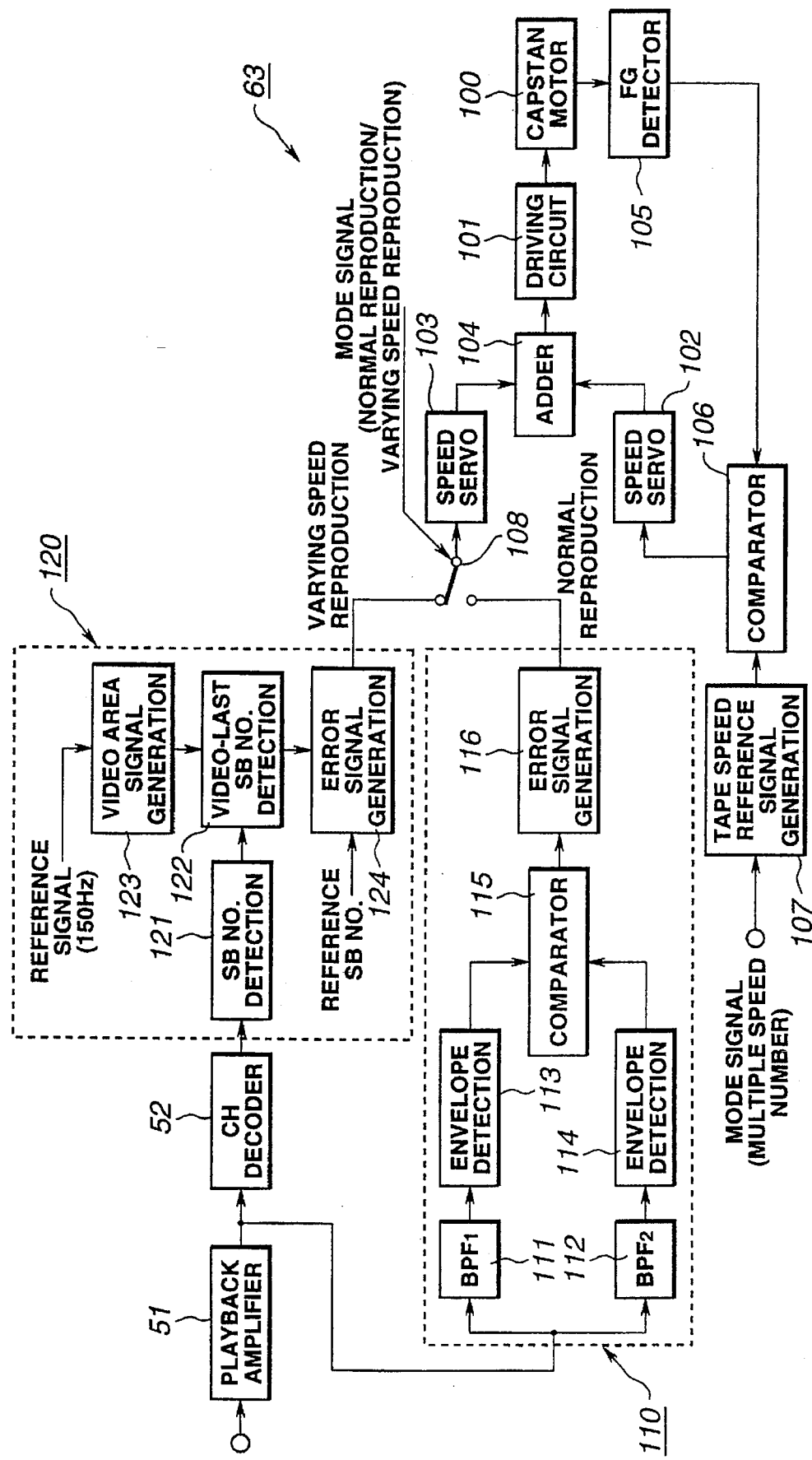
FIG. 7 is a block diagram showing the construction of a capstan servo system of a servo circuit in the reproducing system in the digital VTR.

An output of the output terminal 60 is sent to the video decoder 7 shown in FIG. 7 for decoding. In the present embodiment, the totality of data for one full I-picture is recorded in the trick play areas, as later explained. Since the actual pictures are updated on the picture basis during varying speed reproduction, the varying-speed reproduced picture with spontaneous motion comfortable to view may be produced.

The servo circuit 63 in the reproducing system of the digital VTR 3 has the capstan servo system configured as shown in FIG. 7.

The capstan servo system, which effectuates driving control of a capstan motor 100 for running the magnetic tape, includes a speed servo circuit 102 for generating a speed control signal supplied to a driving circuit 101 of the capstan motor 100 and a phase servo circuit 103 for generating a phase control signal supplied to the driving circuit 101. The speed control signal and the phase control signal are summed by an addition circuit 104 so as to be supplied to the driving circuit 101.

The running speed of the magnetic tape is detected from an FG signal of a frequency proportionate to the rpm of the capstan motor 100 by an FG detector 105. The tape speed detection signal derived from the FG detector 105 is compared by a comparator circuit 106 to a tape speed reference signal from a tape speed reference signal generator 107 configured for generating a tape speed reference signal specifying a tape running speed which is a multiple number speed of the tape running speed for the normal mode as indicated by the mode signal supplied from the controller 61.

The comparator 106 compares the tape speed detection signal and the tape speed reference signal to each other for generating a speed error signal. The speed error signal obtained from this comparator circuit 106 is fed back to the speed servo circuit 102 for applying speed servo for causing the magnetic tape to run at a tape running speed specified by the tape speed reference signal.

The capstan servo system includes a tracking error signal generator 110 for generating a tracking error signal based upon the ATF signal during normal reproduction and a phase error signal generator 120 for generating a phase error signal based upon the sync block number derived from the playback data. The tracking error signal and the phase error signal are fed to the phase servo circuit 103 via a switch 108 which is changed over by the mode signal supplied from the controller 81.

The tracking error signal generator 1110 has first and second band pass filters 111, 112 fed via the playback amplifier 51 with playback signals reproduced from the magnetic tape by the rotary head 28. The first and second band pass filters 111, 112 separate and extract ATF signals from the target track superimposed on the playback signals and the ATF signals from neighboring tracks and transmit the extracted ATF signals via first and second envelope detection circuits 113, 114 to a comparator circuit 115. The comparator circuit 115 compares detected output levels of the first and second envelope detection circuits 113, 114 to each other to produce a comparison output proportionate to the tracking error in order to output a tracking error signal from an error signal generator 116.

During normal reproduction, the tracking error signal generated by the tracking error signal generator 110 based upon the ATF signals are fed back to the phase servo circuit 103 via switch 108 for applying tracking servo in order to cause the rotary head 28 to trace the target track on the magnetic tape.

The phase error signal generator 120 has a sync block number detector 121 fed with a demodulated output of the channel decoder 52. The sync block number detector 121 detects the sync block number from the demodulated output of the channel decoder 52, that is playback data, for supplying the detected sync block number to a last sync block number detector 122.

The last sync block number detector 122 checks the sync block numbers supplied thereto from the sync block number detector 121 for detecting the last sync block number of the video sector based upon the video area signal specifying the range of the video sector supplied from a video area signal generator 123. That is, the last sync block number detector 122 detects the last sync block number of the sync blocks reproduced during each tracing by the rotary head 128 during varying speed reproduction.

The last sync block number detected by the last sync block number detector 122 is supplied to an error signal generator 124.

The video area signal generator 123 is configured for generating a video area signal specifying the video sector area based upon the 150 Hz reference signal synchronized with drum rotation.

The error signal generator 124 compares the reference sync block number supplied from the controller 61 and the last sync block number obtained from the last sync block number detector 122 for outputting the difference as an error signal.

During varying speed reproduction, the phase error signal detected by the phase error signal generator 120 based upon the last sync block number obtained from the playback data per each tracing is fed back to the phase servo circuit 103 via the switch 108 for applying a phase servo in order to cause the rotary head 28 to trace the sync block on the target track of the magnetic tape.

The varying speed reproduction with the digital VTR according to the present invention will be explained in detail.

Figure 8:
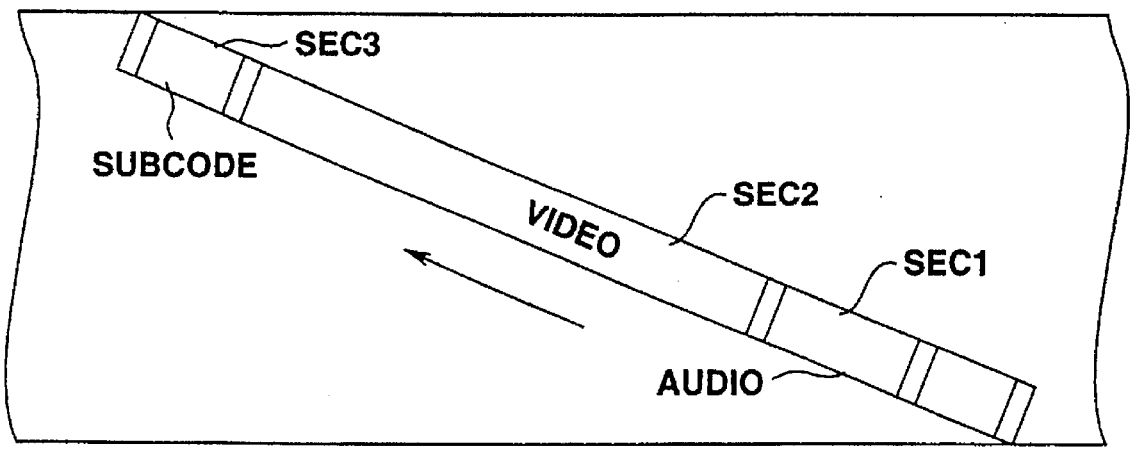
FIG. 8 shows the construction of a track of a magnetic tape in the digital VTR.

In FIG. 8, there is shown the construction of one track in the present digital VTR.

Figure 9:
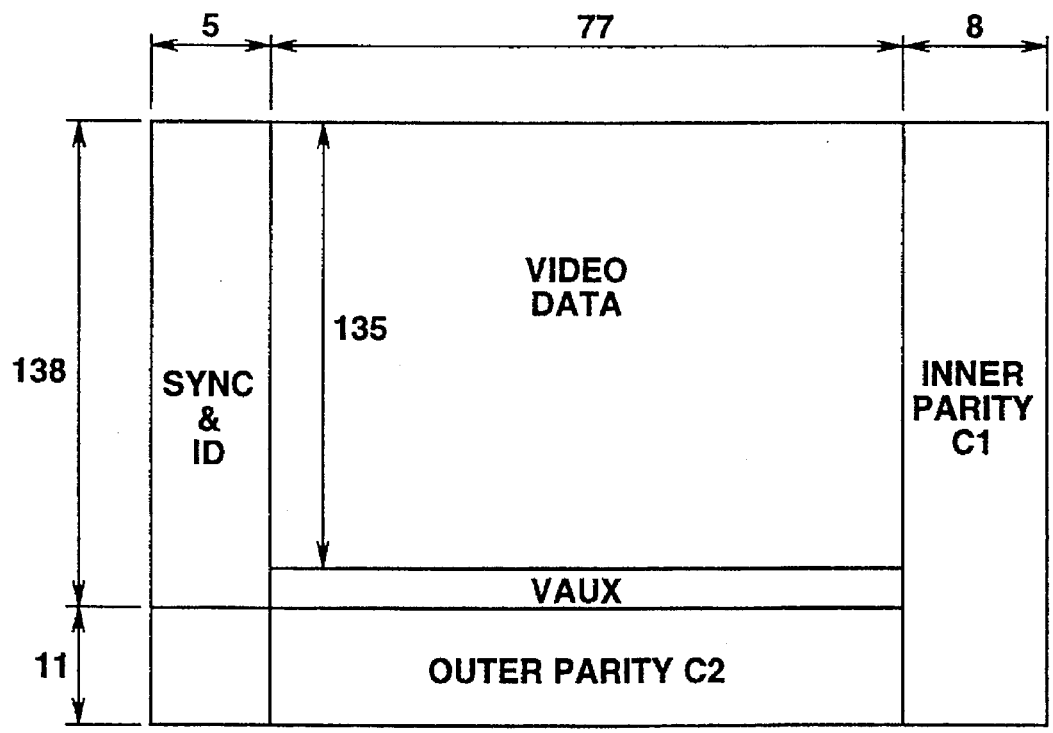
FIG. 9 shows the construction of a video sector.

Each track is made up of an audio sector SEC1, a video sector SEC2 and a subcode sector SEC3. The video sector SEC2 has the capacity for video data corresponding to 135 sync blocks, as shown in FIG. 9. To the leading end of each sync block are added 5-byte sync and ID. To these video data are added spare data (VAUX) equivalent to 3 sync blocks. Dual error correction codes C1, C2 are appended using product codes.

Figure 10:
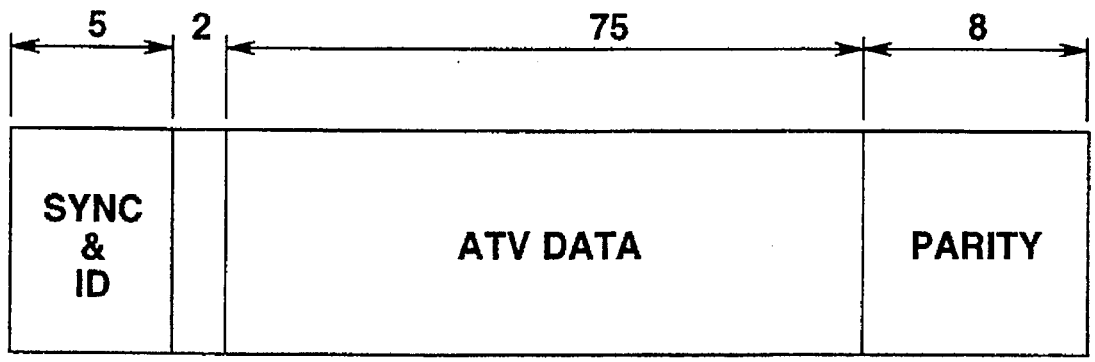
FIG. 10 shows the construction of a sync block.

Thus, video data equivalent to 135 sync blocks are recorded in the video sector SEC2 of each track. For the SD mode, the drum rpm is 150 Hz. Two heads with different azimuths are mounted on a rotary drum and each frame of data is recorded on ten tracks. If, for recording ATV signals, 75 of 77 bytes of the data area in each sync block are used for recording data as shown in FIG. 10, 77×8×135×10×30= 24.948 Mbps represents the data rate that may be employed for recording.

On the other hand, the data rate for ATV signals is approximately 19.2 Mbps. Thus, if the transmitted ATV signals are recorded with the SD mode, 19.2×106/300/77/ 8=104 sync blocks may be employed as the recording region for normal reproduction for recording the entire bitstream. The remaining 135–104=31 sync blocks may be used as the trick play areas TP. If, for improving the picture quality for varying speed reproduction, the ATV signals are used with the SD mode, data of the I-picture are recorded in duplicate as data required for varying-speed reproduction. In the present embodiment, data of the I-picture recorded in the spare recording area is the totality of the low-range coefficient data for the I-pictures. This enables picture-based reproduction during varying speed reproduction.

Figure 11:
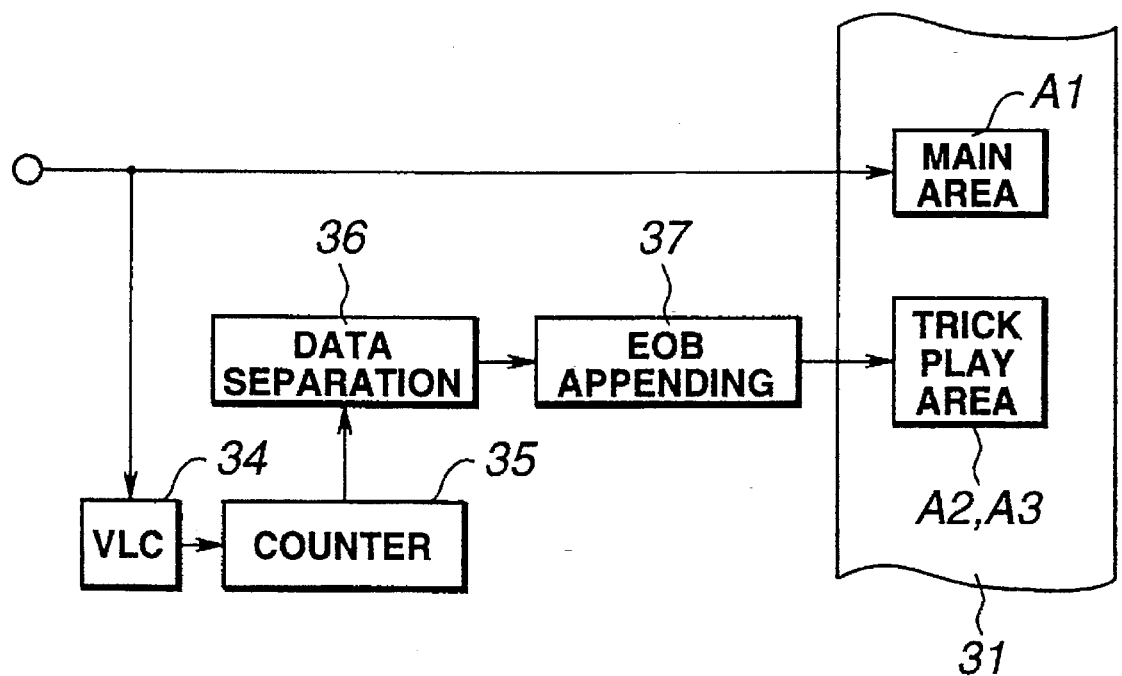
FIG. 11 is a block diagram for illustrating the principle of the recording operation in the digital VTR.

FIG. 11 schematically shows recording/reproduction of ATV signals. A main area A1 and trick play areas A2, A3 are provided on a video sector of a magnetic tape 31. The trick play area A2 corresponds to the above-mentioned spare area and is provided in an area reproducible during varying speed reproduction. During recording, the bitstream or the data stream of the input ATV signals is directly recorded in the main area A1, while being supplied to a variable length decoding circuit 34 which decodes the ATV signals and detects the interruption of the variable length encoded DCT coefficients. An output of the VLC decoding circuit 34 is supplied to a counter 35. The counter 35 counts the number of the DCT coefficients and detects data portions required for varying speed reproduction. An output of the counter 35 is supplied to a data separating circuit 36. The data separating circuit 36 extracts, based upon the output of the counter 35, the data portions of the input bitstream required for varying speed reproduction.

The data required for varying speed reproduction is the motion vector of the P-picture and the low-range coefficients of respective blocks of the I-picture of the ATV signals. Such data is extracted by the data separating circuit 36 from the input bitstream so as to be supplied to an EOB appending circuit 37 which then adds an EOB data specifying the end of data. The data required for varying speed reproduction is recorded in the trick play areas TP.

For normal reproduction, playback signals from the main area are decoded. During varying speed reproduction, the trick play areas TP are reproduced and decoded. Therefore, during the varying speed reproduction, the low-range coefficients of respective blocks of the I-pictures are sent to the video decoder 7. In order to enable these coefficients to be decoded even with the usual video decoder, the data construction of these coefficients needs to be the same as that of the usual bitstream. Thus, during recording, the low-range components are extracted from the respective blocks and the EOB data is appended for specifying the end of data.

The method of determining the trick play areas for recording data for varying speed reproduction is explained.

If, in view of the respective data rates, the recording rate for the digital VTR is set to 24.948 Mbps, 135×(19.2/ 24.948)=104 sync blocks of the video sectors of the respective blocks may be employed for recording data for normal reproduction.

135–104=31 sync blocks may be used for recording data for varying speed reproduction.

Figure 12:
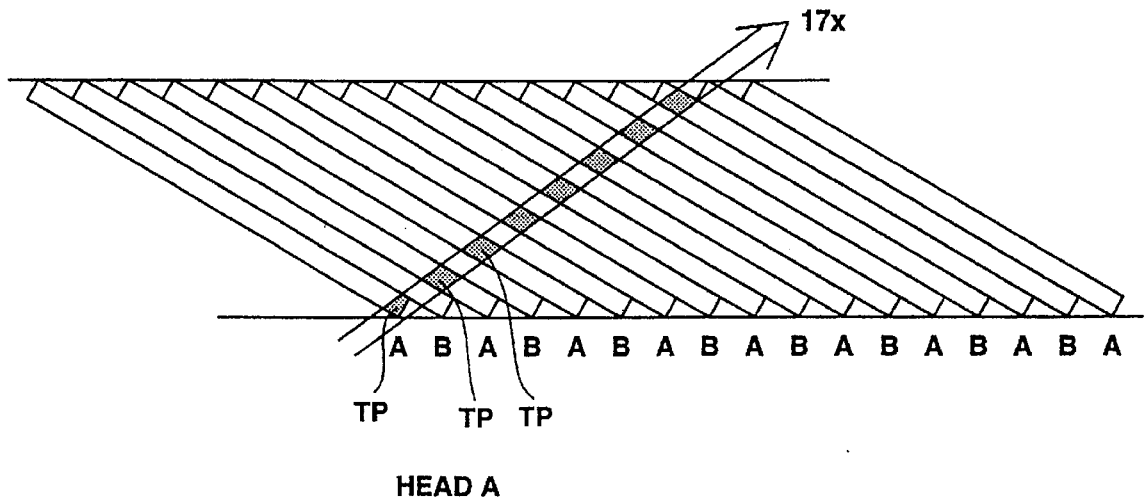
FIG. 12 shows an illustrative example of a trick play area.
Figure 13:
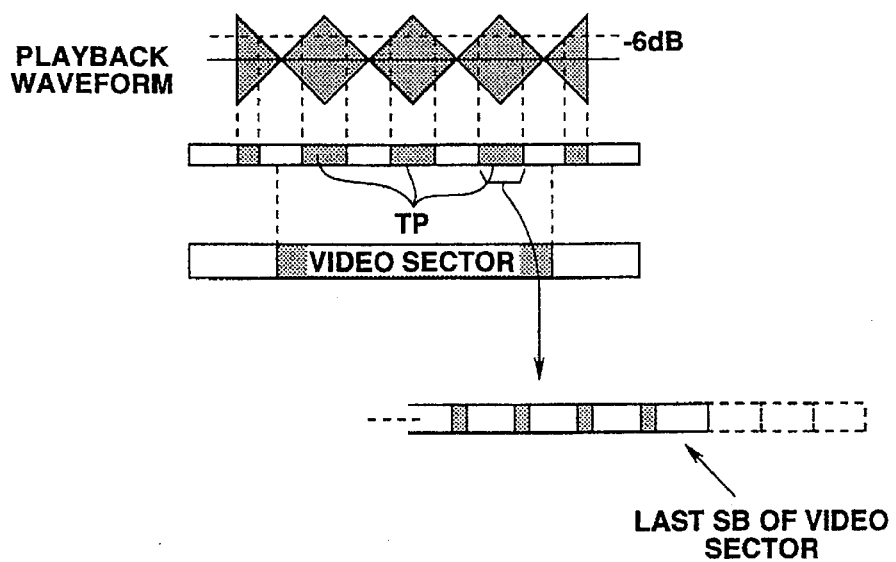
FIG. 13 shows a waveform of the reproduced signal during varying-speed reproduction.

FIG. 12 shows the trajectory of one A of two heads (heads A and B) having different azimuth angles during varying speed reproduction (e.g., 17-tuple speed). If the head A traces the tracks, areas indicated TP represent reproducible areas. This reproducible area may be used as the trick play areas TP for recording data for varying-speed reproduction. With a helical scan/azimuth recording VTR, data reproduced from the trick play areas TP is burst-like, as shown in FIG.

13. If the positions of these trick play areas TP on the track are fixed by ATF and trick play data, that is data for varying-speed reproduction are recorded in these trick play areas TP, these data are necessarily reproduced.

In the present embodiment, the trick play areas are determined in the following manner.

Figure 14A:
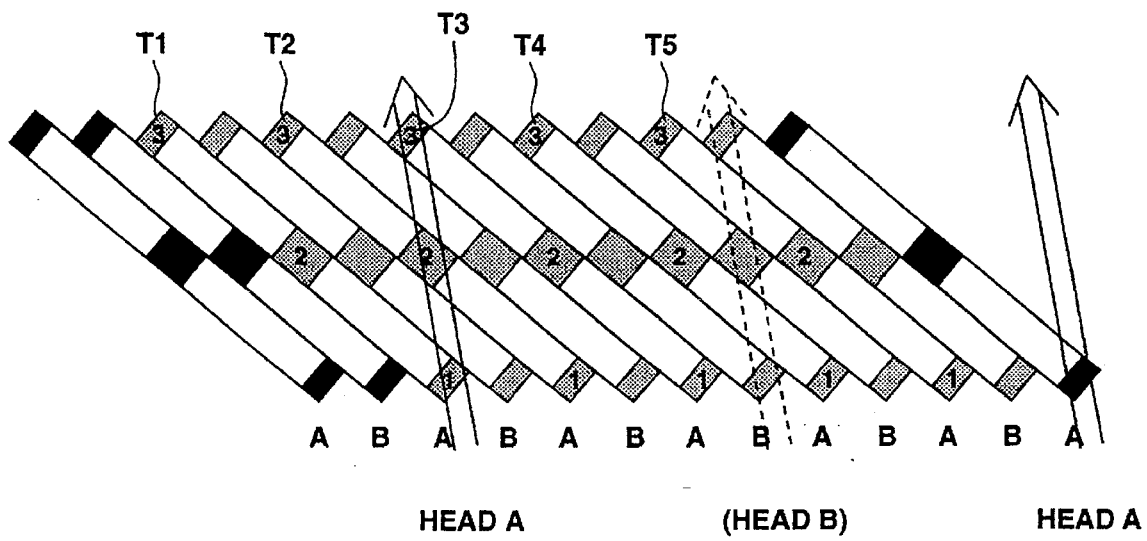
FIGS. 14A and 14B illustrate illustrative examples of a trick play area.
Figure 14B:
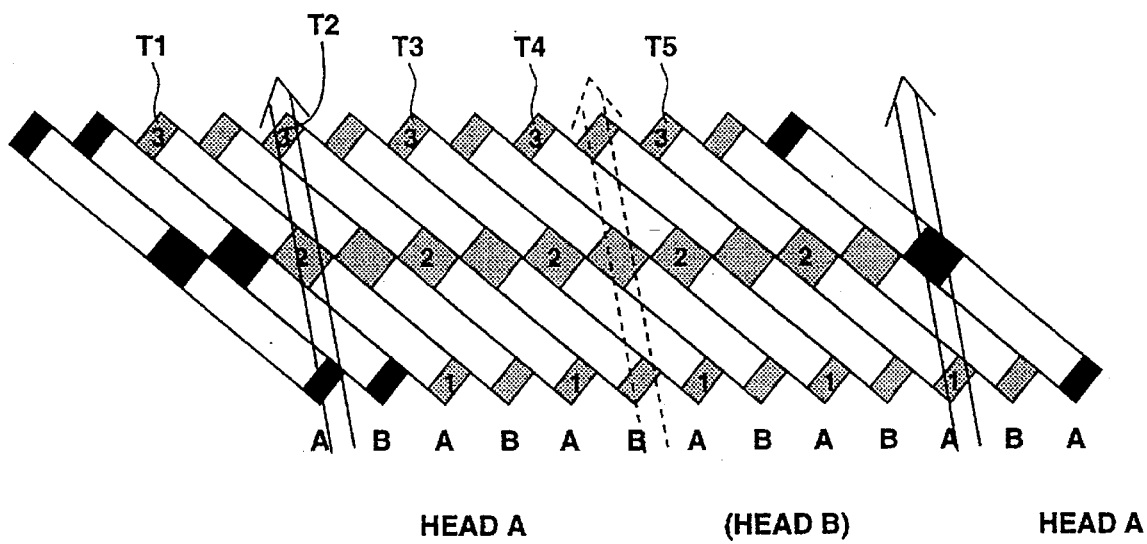

If the maximum speed of the magnetic tape during varying speed reproduction is selected to be an odd number multiple of that of the normal reproduction, that is (2N+1) tuple speed, N being an integer, the areas reproducible with this maximum speed are the trick play areas TP. For example, the maximum speed for varying speed reproduction in FIG. 12 is set to the 17-tuple speed which is an odd number multiple of the speed for normal reproduction. The areas reproducible on reproduction with this 17-tuple speed is selected as being the trick play areas TP. Trick play data is recorded in these trick play areas TP. At this time, recording of the same trick play data on the tracks of the same azimuth is repeated a number of times equal to the number of the multiple speeds of the maximum speed for varying speed reproduction. For example, if the maximum speed for varying speed reproduction 5-tuple speed, the number of multiple of the speed multiple is 5, so that trick play data is repeatedly recorded across five tracks T1 to T5 of the azimuth A, as shown in FIGS. 14A and 14B.

If the trick play areas are set in this manner, varying speed reproduction with (N=0.5)tuple speeds, such as 1.5-, 2.5-, 3.5-tuple speeds, . . . becomes possible along with the maximum speed for varying speed reproduction.

Figure 15:
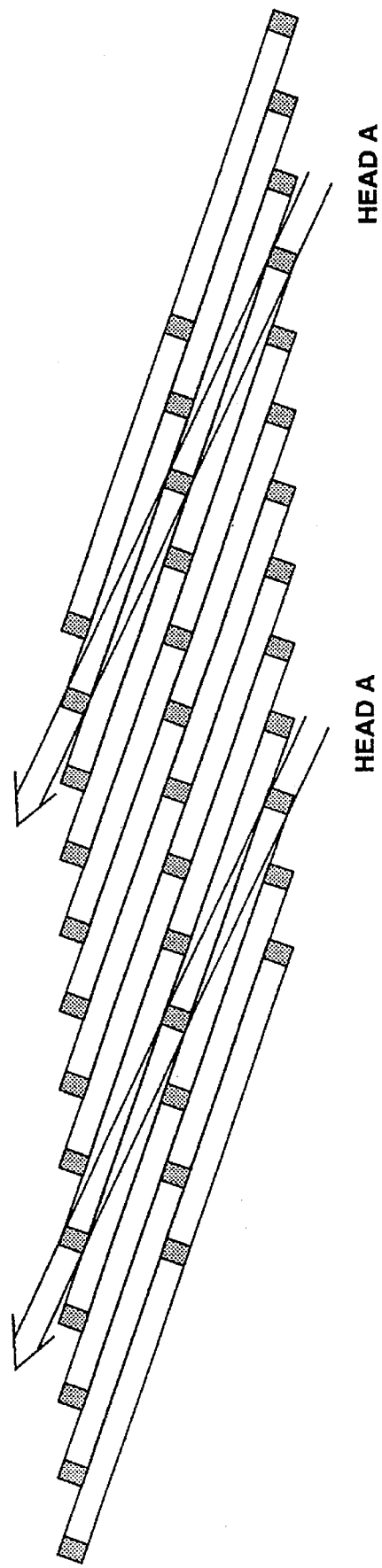
FIG. 15 shows the head trajectory for illustrating the operation during varying speed reproduction.
Figure 16A:
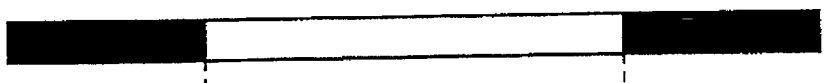
FIG. 16 shows data reproduced during one scan for illustrating the operation during varying-speed reproduction.
Figure 16B:
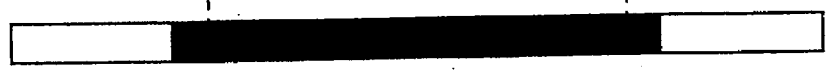

In other words, if the tape speed for varying speed reproduction is set to (N=0.5)tuple speeds, such as 1.5-, 2.5-3.5-tuple speeds, . . . all portions of tracks of the same azimuth can be reproduced by two scans, as shown in FIGS. 15 and 16. FIG. 15 shows the trajectory of the head A carrying out varying speed reproduction at the 3.5-tuple speed, with the maximum varying reproducing speed being 7-tuple speed. In this case, both ends of the tracks of the azimuth A are reproduced by the first scan, as shown in FIG. 16A, while mid portions of the tracks of the azimuth A are reproduced by the second scan, as shown in FIG. 16B. The totality of portions of each track of the azimuth A can be reproduced by two scans. If the same trick play data are repeatedly recorded in each track of the azimuth A, the totality of data of each track of the azimuth A may be reproduced by these two scans.

Therefore, if the maximum speed during varying speed reproduction is (2N+1)tuple speed, and the trick play data is repeatedly recorded in (2N+1) tracks of the azimuth A, trick play data may be reproduced at the (2N+1)tuple speed, 1.5-tuple speed, 2.5-tuple speed, . . . (N+0.5)tuple speed. In the reverse direction, the (2N−1)tuple speed represents the maximum speed.

If the maximum speed for varying speed reproduction is the (2N+1)tuple speed, the areas traced by the head with this maximum speed is selected as the trick play areas, and the trick play data is repeatedly recorded on the same number of the same azimuth tracks as the number of multiple speed of the maximum speed, varying speed reproduction of 1.5-tuple, 2.5-tuple, . . . (N+0.5)tuple speed becomes possible in addition to the maximum varying reproducing speed.

If the maximum varying speed playback speed is the 17-tuple speed, the burst-like area traced by the head A in FIG. 12 is of a length corresponding to 13 sync blocks. If, in consideration of various margins, 4 sync blocks are used as the trick play area, 4×6=24 sync blocks can be secured as trick play areas on one track. If the data for varying speed reproduction is repeatedly recorded as described above, since the one-picture trick data is recorded during recording, picture-based updating becomes possible during varying speed reproduction.

During varying speed reproduction, data consisting only of I-pictures recorded in the first trick play areas TP are reproduced with the maximum varying playback speed of (2N+1)tuple speed, while data composed only of I-pictures recorded in the trick play areas TP are reproduced with other multiple speeds lower than (2N+1)tuple speed, thereby increasing the updating ratio.

Thus, during varying speed reproduction, the trick play data recorded in duplicates in the trick play areas can necessarily be reproduced. The playback data reproduced from the trick play areas become burst-like. The trick play data reproduced from the trick play areas during varying speed playback is sent to the video decoder 7. Since the playback data is burst-like, error codes are inserted during the time when there is no data. Thus the data during such time is disregarded by the video decoder 7.

Although the above description has been made in connection with the digital VTR for recording signals of the ATV signals, the present invention may naturally be applied to a digital VTR designed to record input data obtained on encoding video signals by adaptively switching between the intra-picture coding and inter-picture coding.

What is claimed is:

1. A method for varying speed reproduction of digital video signals comprising the steps of:

running a magnetic tape having digital video signals recorded on inclined tracks thereof at a speed different from the normal running speed;

detecting the number of a pre-set one of sync blocks reproduced by each tracing by a rotary magnetic head; and reproducing digital video signals from said magnetic tape in a phase-locked state by applying phase servo to a tape running system using the difference between the sync block number and the target sync block number as the phase error.

2. An apparatus for reproducing digital video signals recorded on an inclined track of a magnetic tape comprising:

sync block number detection means for detecting the sync block number of a pre-set one of sync blocks reproduced by each tracing by a rotary magnetic head during varying speed reproduction;

phase error signal generating means for outputting the difference between the sync block number detected by said sync block number detection means and the target sync block number as a phase error signal; and feedback means for feeding back the phase error signal obtained by said phase error signal generating means to a phase loop of a tape running system running the magnetic tape.

3. The apparatus as claimed in claim 2, wherein said phase error signal generating means detects the number of the last one of the sync blocks reproduced by each tracing by the rotary magnetic head and outputs the difference between the sync block number and a target sync block number as the phase error signal.

4. An apparatus for reproducing digital video signals recorded on an inclined track of a magnetic tape comprising:

tracking error signal generating means for extracting a tracking control signal from a playback output by a rotary magnetic head for generating a tracking error signal;

phase error signal generating means for generating a phase error signal based upon the number of a pre-set one of sync blocks reproduced by each tracing by said rotary magnetic head;

signal switching means for feeding back the tracking error signal obtained by said tracking error signal generating means during normal reproduction and for feeding back the phase error signal obtained by said phase error signal generating means during varying speed reproduction to a phase loop of a tape running system running a magnetic tape; and reproducing means for reproducing the digital video signals from said magnetic tape under phase locked state by applying a phase servo to the tape running system during varying speed reproduction.

5. The apparatus as claimed in claim 4, wherein said phase error signal generating means detects the number of the last one of the sync blocks reproduced by each tracing by the rotary magnetic head and outputs the difference between the sync block number and a target sync block number as the phase error signal.

* * * * *